United States Patent
Huang

(10) Patent No.: US 11,599,457 B1
(45) Date of Patent: Mar. 7, 2023

(54) DECODING CIRCUIT MODULE, MEMORY CONTROL CIRCUIT UNIT AND MEMORY STORAGE DEVICE

(71) Applicant: PHISON ELECTRONICS CORP., Miaoli (TW)

(72) Inventor: Sheng-Min Huang, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/583,198

(22) Filed: Jan. 25, 2022

(30) Foreign Application Priority Data

Dec. 24, 2021 (TW) .................................. 110148791

(51) Int. Cl.
G06F 12/00 (2006.01)
G06F 12/02 (2006.01)
G06F 13/16 (2006.01)

(52) U.S. Cl.
CPC ...... *G06F 12/0238* (2013.01); *G06F 13/1673* (2013.01); *G06F 2212/7203* (2013.01); *G06F 2212/7206* (2013.01)

(58) Field of Classification Search
CPC ............. G06F 12/0238; G06F 13/1673; G06F 2212/7203; G06F 2212/7206
See application file for complete search history.

(56) References Cited

U.S. PATENT DOCUMENTS

2017/0199685 A1* 7/2017 Kim ...................... G06F 3/0659

FOREIGN PATENT DOCUMENTS

CN 106960679 11/2020

OTHER PUBLICATIONS

"Office Action of Taiwan Counterpart Application", dated Sep. 29, 2022, p. 1-p. 8.

* cited by examiner

*Primary Examiner* — Shawn X Gu
(74) *Attorney, Agent, or Firm* — JCIPRNET

(57) ABSTRACT

A decoding circuit module, a memory control circuit unit, and a memory storage device are disclosed. The decoding circuit module is configured to decode data read from a rewritable non-volatile memory module and the decoding circuit module includes a first buffer, a second buffer, a first decoding circuit, and a second decoding circuit. The first decoding circuit is configured to decode first data read from the rewritable non-volatile memory module and stored in the first buffer. The second decoding circuit is configured to decode second data read from the rewritable non-volatile memory module and stored in the second buffer. A data decoding ability of the first decoding circuit is different from a data decoding ability of the second decoding circuit. The second data is stored in the second buffer via the first buffer and is not decoded by the first decoding circuit.

30 Claims, 6 Drawing Sheets

US 11,599,457 B1

DECODING CIRCUIT MODULE, MEMORY CONTROL CIRCUIT UNIT AND MEMORY STORAGE DEVICE

CROSS-REFERENCE TO RELATED APPLICATION

This application claims the priority benefit of Taiwan application serial no. 110148791, filed on Dec. 24, 2021. The entirety of the above-mentioned patent application is hereby incorporated by reference herein and made a part of this specification.

BACKGROUND OF THE INVENTION

Technology Field

The invention relates to a decoding circuit, and more particularly to a decoding circuit module, a memory control circuit unit, and a memory storage device.

Description of Related Art

Due to the rapid developments of digital cameras, cellular phones, and MP3 players in recent years, consumer demand for storage media has rapidly increased. Since a rewritable non-volatile memory module (such as a flash memory) has characteristics such as data non-volatility, power-saving, small size, and no mechanical structures, the rewritable non-volatile memory module is very suitable to be built into the various portable multimedia devices provided above.

Many memory controllers are equipped with a decoding circuit to perform error detection and correction on the data read from the rewritable non-volatile memory module. However, the existing decoding circuits are mainly designed via the adopted decoding process, which is relatively inflexible in use. For example, in a circuit architecture including both a primary decoding circuit and an advanced decoding circuit, the data read from the rewritable non-volatile memory module needs to first be processed by the primary decoding circuit. If the primary decoding circuit may not successfully decode the data, the primary decoding circuit may continue to send the data to the advanced decoding circuit for advanced decoding. However, under this circuit architecture, once the advanced decoding circuit is in a busy state, the primary decoding circuit needs to wait until the advanced decoding circuit has finished working before processing the next data. If the advanced decoding circuit is always busy, the idle time of the primary decoding circuit will also increase, resulting in a waste of system resources.

SUMMARY

The invention provides a decoding circuit module, a memory control circuit unit, and a memory storage device that may improve the working efficiency of different types of decoding circuits in the decoding circuit module.

An exemplary embodiment of the invention provides a decoding circuit module configured to decode data read from a rewritable non-volatile memory module. The decoding circuit module includes a first buffer, a second buffer, a first decoding circuit, and a second decoding circuit. The first buffer is coupled to the rewritable non-volatile memory module. The second buffer is coupled to the first buffer. The first decoding circuit is coupled to the first buffer and the second buffer. The second decoding circuit is coupled to the second buffer. The first decoding circuit is configured to decode first data read from the rewritable non-volatile memory module and stored in the first buffer. The second decoding circuit is configured to decode second data read from the rewritable non-volatile memory module and stored in the second buffer. A data decoding ability of the first decoding circuit is different from a data decoding ability of the second decoding circuit. The second data is stored in the second buffer via the first buffer and is not decoded by the first decoding circuit.

An exemplary embodiment of the invention further provides a memory control circuit unit configured to control a rewritable non-volatile memory module. The memory control circuit unit includes a host interface, a memory interface, a decoding circuit module, and a memory management circuit. The host interface is configured to be coupled to a host system. The memory interface is configured to be coupled to the rewritable non-volatile memory module. The decoding circuit module is coupled to the rewritable non-volatile memory module and configured to decode data read from the rewritable non-volatile memory module. The memory management circuit is coupled to the host interface, the memory interface, and the decoding circuit module. The decoding circuit module includes a first buffer, a second buffer, a first decoding circuit, and a second decoding circuit. The first buffer is coupled to the rewritable non-volatile memory module. The second buffer is coupled to the first buffer. The first decoding circuit is coupled to the first buffer and the second buffer. The second decoding circuit is coupled to the second buffer. The first decoding circuit is configured to decode first data read from the rewritable non-volatile memory module and stored in the first buffer. The second decoding circuit is configured to decode second data read from the rewritable non-volatile memory module and stored in the second buffer. A data decoding ability of the first decoding circuit is different from a data decoding ability of the second decoding circuit. The second data is stored in the second buffer via the first buffer and is not decoded by the first decoding circuit.

An exemplary embodiment of the invention further provides a memory storage device including a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The memory control circuit unit includes a decoding circuit module. The decoding circuit module includes a first buffer, a second buffer, a first decoding circuit, and a second decoding circuit. The first buffer is coupled to the rewritable non-volatile memory module. The second buffer is coupled to the first buffer. The first decoding circuit is coupled to the first buffer and the second buffer. The second decoding circuit is coupled to the second buffer. The first decoding circuit is configured to decode first data read from the rewritable non-volatile memory module and stored in the first buffer. The second decoding circuit is configured to decode second data read from the rewritable non-volatile memory module and stored in the second buffer. A data decoding ability of the first decoding circuit is different from a data decoding ability of the second decoding circuit. The second data is stored in the second buffer via the first buffer and is not decoded by the first decoding circuit.

Based on the above, the decoding circuit module may include a first decoding circuit and a second decoding circuit having different data decoding abilities. The first decoding circuit may be configured to decode the first data read from the rewritable non-volatile memory module and stored in the first buffer. The second decoding circuit may be configured to decode the second data read from the rewritable non-volatile memory module and stored in the second buffer. In particular, the second data may be stored in the second buffer via the first buffer and is not decoded by the first decoding circuit. In this way, the working efficiency of different types of decoding circuits in the decoding circuit module may be improved.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In general, a memory storage device (also referred to as a memory storage system) includes a rewritable non-volatile memory module and a controller (also referred to as a control circuit). The memory storage device may be used with a host system, such that the host system may write data into the memory storage device or read data from the memory storage device.

Figure 1:
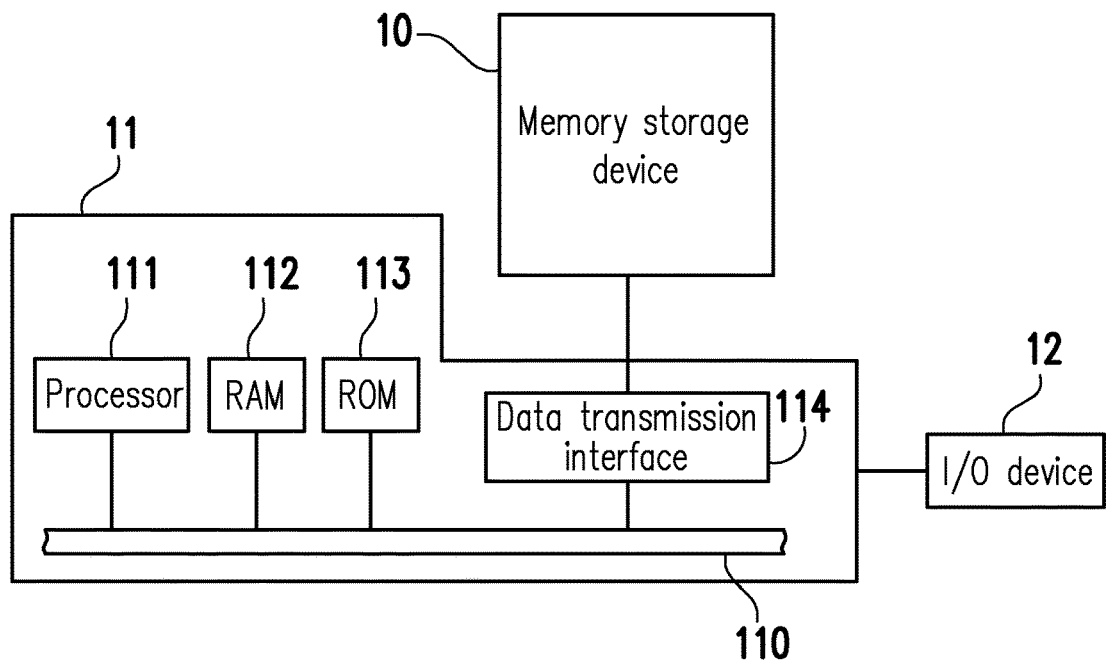
FIG. 1 is a schematic diagram of a host system, a memory storage device, and an input/output (I/O) device shown according to an exemplary embodiment of the invention.
Figure 2:
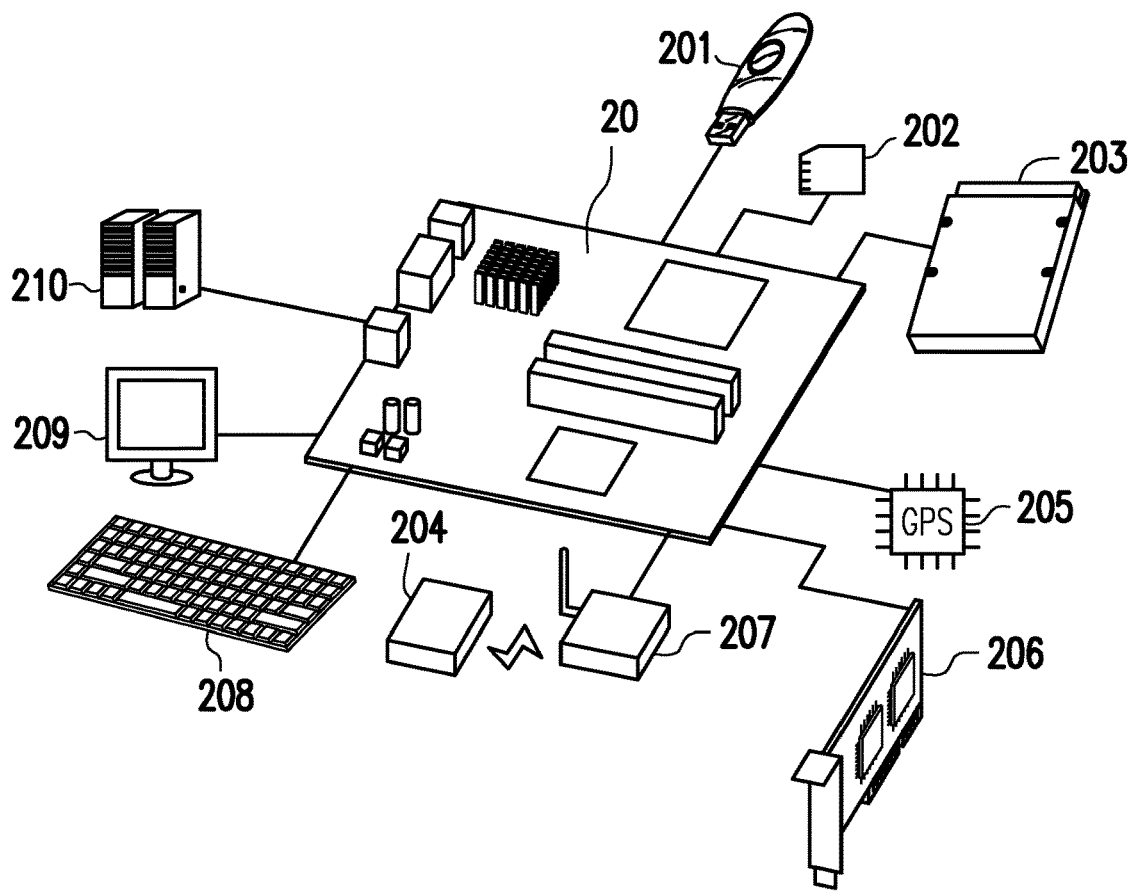
FIG. 2 is a schematic diagram of a host system, a memory storage device, and an I/O device shown according to an exemplary embodiment of the invention.

FIG. 1 is a schematic diagram of a host system, a memory storage device, and an input/output (I/O) device shown according to an exemplary embodiment of the invention. FIG. 2 is a schematic diagram of a host system, a memory storage device, and an I/O device shown according to an exemplary embodiment of the invention.

Referring to FIG. 1 and FIG. 2, a host system 11 may include a processor 111, a random-access memory (RAM) 112, a read-only memory (ROM) 113, and a data transmission interface 114. The processor 111, the RAM 112, the ROM 113, and the data transmission interface 114 may be coupled to a system bus 110.

In an exemplary embodiment, the host system 11 may be coupled to a memory storage device 10 via the data transmission interface 114. For example, the host system 11 may store data into the memory storage device 10 or read data from the memory storage device 10 via the data transmission interface 114. Moreover, the host system 11 may be coupled to the I/O device 12 via the system bus 110. For example, the host system 11 may send an output signal to the I/O device 12 or receive an input signal from the I/O device 12 via the system bus 110.

In an exemplary embodiment, the processor 111, the RAM 112, the ROM 113, and the data transmission interface 114 may be disposed on a motherboard 20 of the host system 11. The quantity of the data transmission interface 114 may be one or a plurality. The motherboard 20 may be coupled to the memory storage device 10 in a wired or wireless method via the data transmission interface 114.

In an exemplary embodiment, the memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fax (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard 208, a screen 209, or a speaker 210 via the system bus 110. For example, in an exemplary embodiment, the motherboard 20 may access the wireless memory storage device 204 via the wireless transmission device 207.

In an exemplary embodiment, the host system 11 is a computer system. In an exemplary embodiment, the host system 11 may be any system that may substantially store data with a memory storage device. In an exemplary embodiment, the memory storage device 10 and the host system 11 may respectively include a memory storage device 30 and a host system 31 of FIG. 3.

Figure 3:
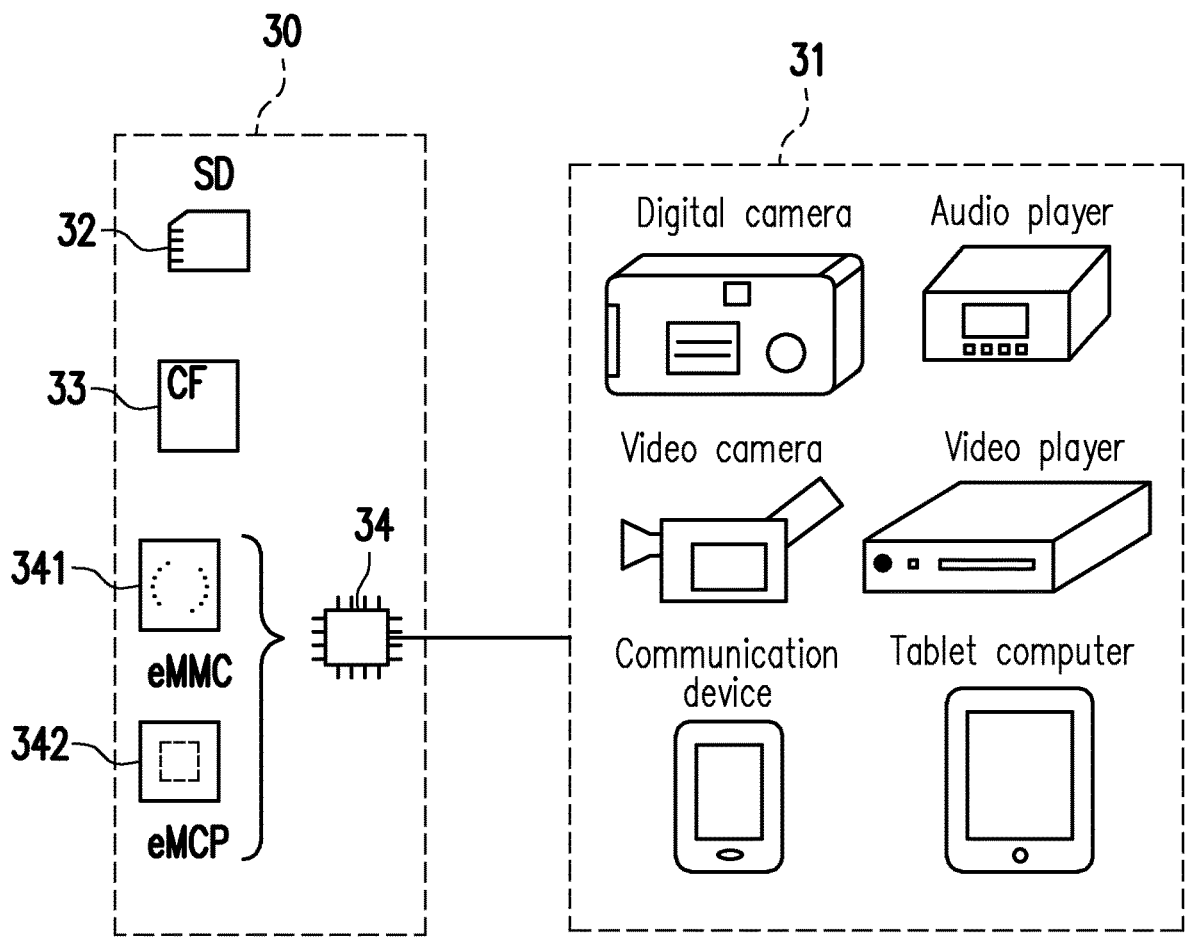
FIG. 3 is a schematic of a host system and a memory storage device shown according to an exemplary embodiment of the invention.

FIG. 3 is a schematic diagram of a host system and a memory storage device shown according to an exemplary embodiment of the invention. Referring to FIG. 3, the memory storage device 30 may be used in conjunction with the host system 31 to store data. For example, the host system 31 may be a system such as a digital camera, a video camera, a communication device, an audio player, a video player, or a tablet computer. For example, the memory storage device 30 may be various non-volatile memory storage devices such as a Secure Digital (SD) card 32, a Compact Flash (CF) card 33, or an embedded storage device 34 used by the host system 31. The embedded storage device 34 includes various types of embedded storage devices for which a memory module is directly coupled on the substrate of the host system, such as an embedded multimedia card (eMMC) 341 and/or an embedded multi-chip package (eMCP) storage device 342.

Figure 4:
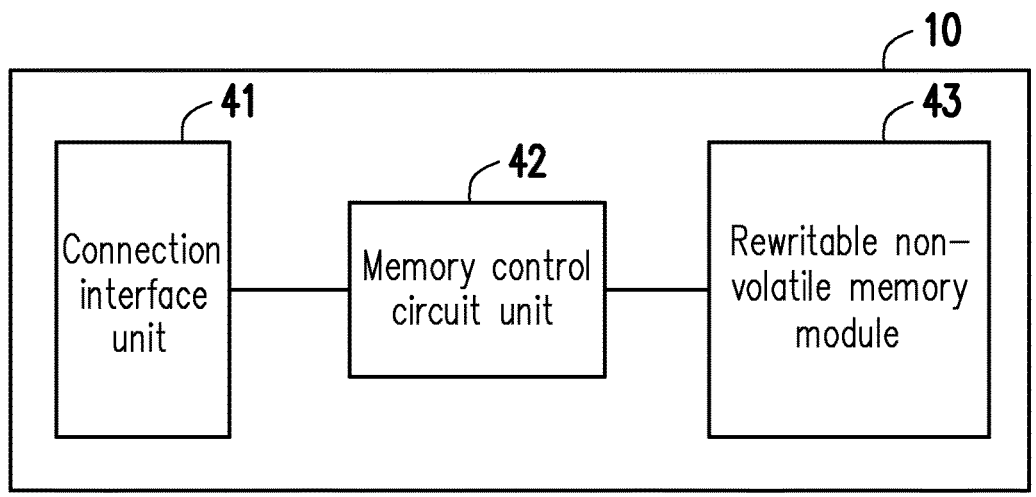
FIG. 4 is a schematic diagram of a memory storage device shown according to an exemplary embodiment of the invention.

FIG. 4 is a schematic diagram of a memory storage device shown according to an exemplary embodiment of the invention. Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may communicate with the host system 11 via the connection interface unit 41. In an exemplary embodiment, the connection interface unit 41 is compatible with the Peripheral Component Interconnect Express (PCI Express) standard. In an exemplary embodiment, the connection interface unit 41 may also conform to the Serial Advanced Technology Attachment (SATA) standard, Parallel Advanced Technology Attachment (PATA) standard, Institute of Electrical and Electronic Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 41 may be sealed in a chip with the memory control circuit unit 42. Alternatively, the connection interface unit 41 is disposed outside of a chip containing the memory control circuit unit 42.

The memory control circuit unit 42 is coupled to the connection interface unit 41 and the rewritable non-volatile memory module 43. The memory control circuit unit 42 is configured to perform a plurality of logic gates or control commands implemented in a hardware form or in a firmware form. The memory control circuit unit 404 also performs operations such as writing, reading, and erasing data in the rewritable non-volatile memory storage module 43 according to the commands of the host system 11.

The rewritable non-volatile memory module 43 is configured to store data written by the host system 11. The rewritable non-volatile memory module 43 may include a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 43 stores one or a plurality of bits via the change in voltage (also referred to as threshold voltage hereinafter). Specifically, a charge-trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 43 has a plurality of storage statuses. Which storage status one memory cell belongs to may be determined via the application of a read voltage, so as to obtain one or a plurality of bits stored by the memory cell.

In an exemplary embodiment, the memory cells of the rewritable non-volatile memory module 43 may form a plurality of physical programming units, and these physical programming units may form a plurality of physical erasing units. Specifically, the memory cells on the same word line may form one or a plurality of physical programming units. If each memory cell may store two or more bits, the physical programming units on the same word line may at least be classified into lower physical programming units and upper physical programming units. For example, the least significant bit (LSB) of a memory cell belongs to the lower physical programming units, and the most significant bit (MSB) of a memory cell belongs to the upper physical programming units. Generally, in an MLC NAND-type flash memory, the write speed of the lower physical programming units is greater than the write speed of the upper physical programming units, and/or the reliability of the lower physical programming units is greater than the reliability of the upper physical programming units.

In an exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming units may include a data bit area and a redundant bit area. The data bit area contains a plurality of physical pages configured to store user data, and the redundant bit area is configured to store system data (for example, management data such as an ECC). In an exemplary embodiment, the data bit area contains 32 physical pages, and the size of one physical sector is 512 bytes (B). However, in other exemplary embodiments, the data bit area may also contain 8, 16, or a greater or lesser number of physical pages, and the size of each of the physical pages may also be greater or smaller. Moreover, the physical erasing unit is the smallest unit of erasing. That is, each of the physical erasing units contains the smallest number of memory cells erased together. For example, the physical erasing unit is a physical block.

Figure 5:
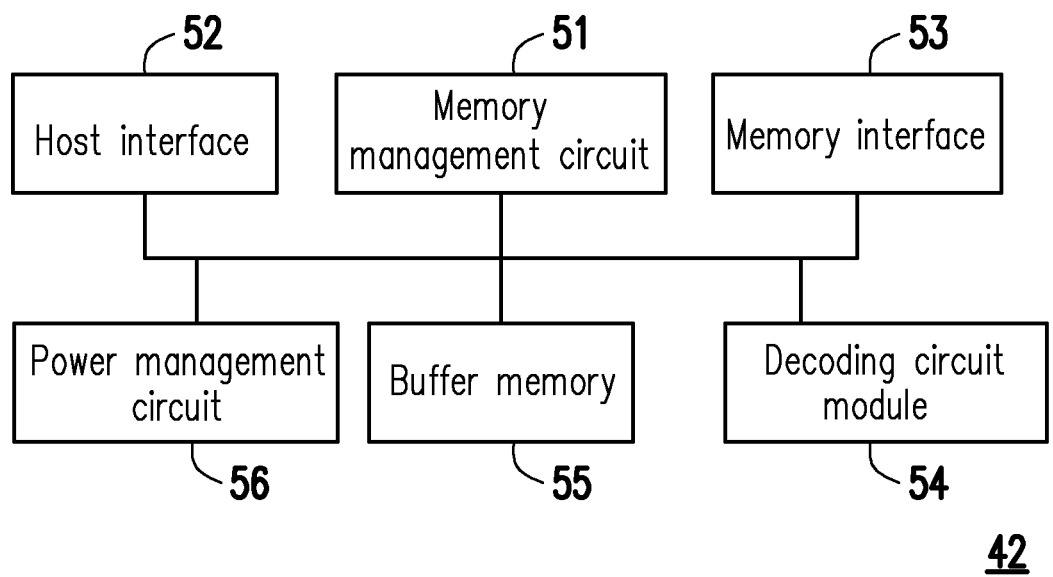
FIG. 5 is a schematic diagram of a memory control circuit unit shown according to an exemplary embodiment of the invention.

FIG. 5 is a schematic diagram of a memory control circuit unit shown according to an exemplary embodiment of the invention. Please refer to FIG. 5, the memory control circuit unit 42 includes a memory management circuit 51, a host interface 52, a memory interface 53, and a decoding circuit module 54.

The memory management circuit 51 is configured to control the overall operation of the memory control circuit unit 42. Specifically, the memory management circuit 51 has a plurality of control commands. During operation of the memory storage device 10, the control commands are executed to perform operations such as writing, reading, and erasing data. In the following, descriptions relating to the operation of the memory management circuit 51 are equivalent to the descriptions of the operation of the memory control circuit unit 42.

In an exemplary embodiment, the control commands of the memory management circuit 51 are implemented in a firmware form. For example, the memory management circuit 51 has a microprocessor unit (not shown) and a read-only memory (not shown), and the control commands are burned into the ROM. During the operation of the memory storage device 10, the control commands are executed by the microprocessor unit to perform operations such as writing, reading, and erasing data.

In an exemplary embodiment, the control commands of the memory management circuit 51 may also be stored in the form of program codes in a specific area (for example, the system area in a memory module exclusively configured to store system data) of the rewritable non-volatile memory module 43. Moreover, the memory management circuit 51 has a microprocessor unit (not shown), a ROM (not shown), and a RAM (not shown). In particular, the ROM has a boot code, and when the memory control circuit unit 42 is enabled, the microprocessor unit first executes the boot code to load the control commands stored in the rewritable non-volatile memory module 43 into the RAM of the memory management circuit 51. Next, the microprocessor unit runs the control commands to perform operations such as writing, reading, and erasing data.

In an exemplary embodiment, the control commands of the memory management circuit 51 may also be implemented in a hardware form. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cells or memory cell groups of the rewritable non-volatile memory module 43. The memory write circuit is configured to issue a write command sequence to the rewritable non-volatile memory module 43 to write data into the rewritable non-volatile memory module 43. The memory read circuit is configured to issue a read command sequence to the rewritable non-volatile memory module 43 to read data from the rewritable non-volatile memory module 43. The memory erase circuit is configured to issue an erase command sequence to the rewritable non-volatile memory module 43 to erase data from the rewritable non-volatile memory module 43. The data processing circuit is configured to process data to be written into the rewritable non-volatile memory module 43 and data read from the rewritable non-volatile memory module 43. The write command sequence, the read command sequence, and the erase command sequence may independently include one or a plurality of program codes or command codes and be configured to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct the performance of corresponding operations.

The host interface 52 is coupled to the memory management circuit 51. The memory management circuit 51 may communicate with the host system 11 via the host interface 52. The host interface 52 may be used to receive and identify commands and data sent by the host system 11. For example, the commands and data sent by the host system 11 may be sent to the memory management circuit 51 via the host interface 52. In addition, the memory management circuit 51 may send data to the host system 11 via the host interface 52. In the present exemplary embodiment, the host interface 52 is compatible with the PCI Express standard. However, it should be understood that the invention is not limited thereto, and the host interface 52 may also be compatible with the SATA standard, PATA standard, IEEE 1394 standard, USB standard, SD standard, UHS-I standard, UHS-II standard, MS standard, MMC standard, eMMC standard, UFS standard, CF standard, IDE standard, or other suitable standards for data transmission.

The memory interface 53 is coupled to the memory management circuit 51 and is configured to access the rewritable non-volatile memory module 43. For example, the memory management circuit 51 may access the rewritable non-volatile memory module 43 via the memory interface 53. In other words, data to be written into the rewritable non-volatile memory module 43 is converted to a format acceptable to the rewritable non-volatile memory module 43 via the memory interface 53.

Specifically, if the memory management circuit 51 is to access the rewritable non-volatile memory module 43, the memory interface 53 sends a corresponding command sequence. For example, the command sequences may include a write command sequence instructing data writing, a read command sequence instructing data reading, an erase command sequence instructing data erasing, and corresponding command sequences configured to instruct various memory operations (such as changing read voltage level or performing a garbage collection operation). The command sequences are generated by, for example, the memory management circuit 51 and sent to the rewritable non-volatile memory module 43 via the memory interface 53. The command sequences may include one or a plurality of signals or data on a bus. The signals or data may include a command code or a program code. For example, when reading a command sequence, information such as read identification code or memory address is included.

The decoding circuit module (also called the error detecting and correcting circuit) 54 is coupled to the memory management circuit 51 and is configured to perform an error detecting and correcting operation to ensure the correctness of data. Specifically, when the memory management circuit 51 receives a write command from the host system 11, the decoding circuit module 54 generates a corresponding error correcting code (ECC) and/or an error detecting code (EDC) for data corresponding to the write command, and the memory management circuit 51 writes the data corresponding to the write command and the corresponding ECC and/or EDC into the rewritable non-volatile memory module 43. Next, when reading data from the rewritable non-volatile memory module 43, the memory management circuit 51 reads the ECC and/or the EDC corresponding to the data at the same time, and the decoding circuit module 54 performs an error detecting and correcting operation on the read data based on the ECC and/or the EDC.

In an exemplary embodiment, the memory control circuit unit 42 further includes a buffer memory 55 and a power management circuit 56. The buffer memory 55 is coupled to the memory management circuit 51 and configured to temporarily store data. The power management circuit 56 is coupled to the memory management circuit 51 and is configured to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
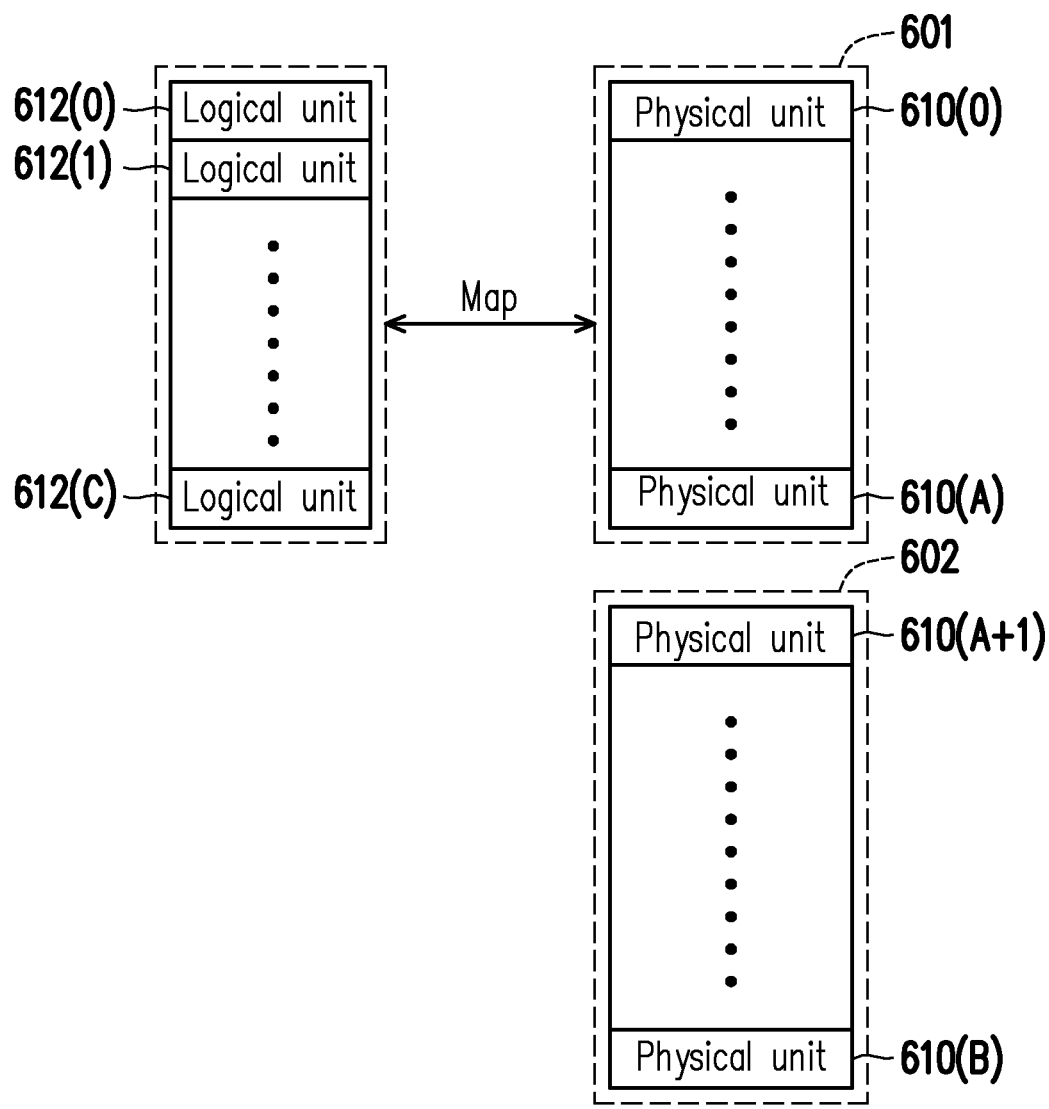
FIG. 6 is a schematic diagram of the management of a rewritable non-volatile memory module shown according to an exemplary embodiment of the invention.

FIG. 6 is a schematic diagram of the management of a rewritable non-volatile memory module shown according to an exemplary embodiment of the invention.

Referring to FIG. 6, the memory management circuit 51 may logically group physical units 610(0) to 610(B) in the rewritable non-volatile memory module 43 into a storage area 601 and a spare area 602.

In an exemplary embodiment, one physical unit refers to one physical address or one physical programming unit. In an exemplary embodiment, one physical unit may also be formed by a plurality of continuous or discontinuous physical addresses. In an exemplary embodiment, one physical unit may also refer to one virtual block (VB). One virtual block may include a plurality of physical addresses or a plurality of physical programming units.

The physical units 610(0) to 610(A) in the storage area 601 are configured to store user data (for example, user data from the host system 11 in FIG. 1). For example, the physical units 610(0) to 610(A) in the storage area 601 may store valid data and invalid data. The physical units 610(A+1) to 610(B) in the spare area 602 do not store data (for example, valid data). For example, if a certain physical unit does not store valid data, this physical unit may be associated (or added) to the spare area 602. In addition, the physical units in the spare area 602 (or physical units that do not store valid data) may be erased. When writing new data, one or a plurality of physical units may be extracted from the spare area 602 to store the new data. In an exemplary embodiment, the spare area 602 is also referred to as a free pool.

The memory management circuit 51 may configure logical units 612(0) to 612(C) to map the physical units 610(0) to 610(A) in the storage area 601. In an exemplary embodiment, each of the logical units corresponds to one logical address. For example, one logical address may include one or a plurality of logical block addresses (LBAs) or other logical management units. In an exemplary embodiment, one logical unit may also correspond to one logic programming unit or formed by a plurality of continuous or discontinuous logical addresses.

It should be mentioned that, one logical unit may be mapped to one or a plurality of physical units. If a certain physical unit is currently mapped by a certain logical unit, the data currently stored in this physical unit include valid data. On the other hand, if a certain physical unit is not currently mapped by any logical unit, the data currently stored in this physical unit is invalid data.

The memory management circuit 51 may record the management data describing the mapping relationship between logical units and physical units (also called logical-to-physical or logical address-to-logical address (L2P) mapping information) in at least one logical-to-physical mapping table. When the host system 11 is to read data from the memory storage device 10 or write data to the memory storage device 10, the memory management circuit 51 may access the rewritable non-volatile memory module 43 according to the information in the logical-to-physical mapping table.

Figure 7:
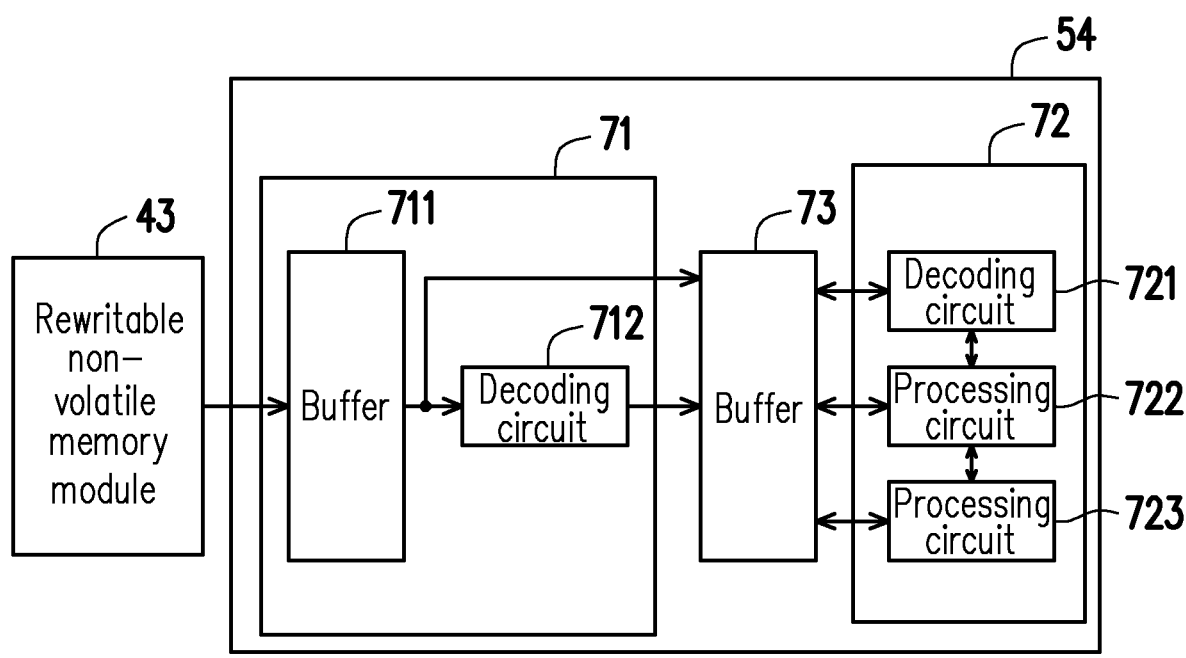
FIG. 7 is a schematic diagram of a decoding circuit module shown according to an exemplary embodiment of the invention.

FIG. 7 is a schematic diagram of a decoding circuit module shown according to an exemplary embodiment of the invention. Referring to FIG. 7, the decoding circuit module 54 includes a buffer (also referred to as a first buffer or an internal buffer) 711, a buffer (also referred to as a second buffer or a system buffer) 73, a decoding circuit (also referred to as a first decoding circuit) 712, and a decoding circuit (also referred to as a second decoding circuit) 721. The buffer 711 is coupled to the rewritable non-volatile memory module 43 and the decoding circuit 712. The buffer 73 is coupled to the buffer 711, the decoding circuit 712, and the decoding circuit 721. Both the buffers 711 and 73 are configured to temporarily store (or cache) data. Both the decoding circuits 711 and 721 are configured to decode the data read from the rewritable non-volatile memory module 43.

The data decoding ability of the decoding circuit 712 is different from the data decoding ability of the decoding circuit 721. For example, the data decoding ability of the decoding circuit 721 may be higher than the data decoding ability of the decoding circuit 712. For example, compared to the decoding circuit 712, the decoding circuit 721 may correct more error bits in the data. However, compared to the decoding circuit 721, the decoding circuit 712 may complete the decoding operation faster, regardless of whether the decoding is successful or not.

In an exemplary embodiment, the circuit complexity of the decoding circuit 721 may be higher than the circuit complexity of the decoding circuit 712. In an exemplary embodiment, the complexity of the decoding operation performed by the decoding circuit 721 may be higher than the complexity of the decoding operation performed by the decoding circuit 712.

In an exemplary embodiment, the decoding circuit 712 may be configured to implement a bit flipping algorithm. In an exemplary embodiment, the decoding circuit 721 may be configured to implement at least one of a sum-product algorithm and a min-sum algorithm. It should be noted that both the decoding circuits 712 and 721 may be configured to implement other types of data encoding/decoding algorithms, and the invention is not limited in this regard.

In an exemplary embodiment, the buffer 711 is dedicated to temporarily store data read from the rewritable non-volatile memory module 43, for example, data read from the rewritable non-volatile memory module 43 and to be decoded. In particular, the buffer 711 may not belong to the buffer memory 55 of FIG. 5. In an exemplary embodiment, compared to the buffer 711, the buffer 73 may be regarded as a portion of the buffer memory 55. Thereby, the decoding circuit module 54 may communicate with other circuits in the memory control circuit unit 42 of FIG. 5 via the buffer 73. For example, the decoding circuit module 54 may send the decoded data to the buffer 73 for access by the memory management circuit 51 or to the host system 11 of FIG. 1 via the host interface 52.

Figure 8:
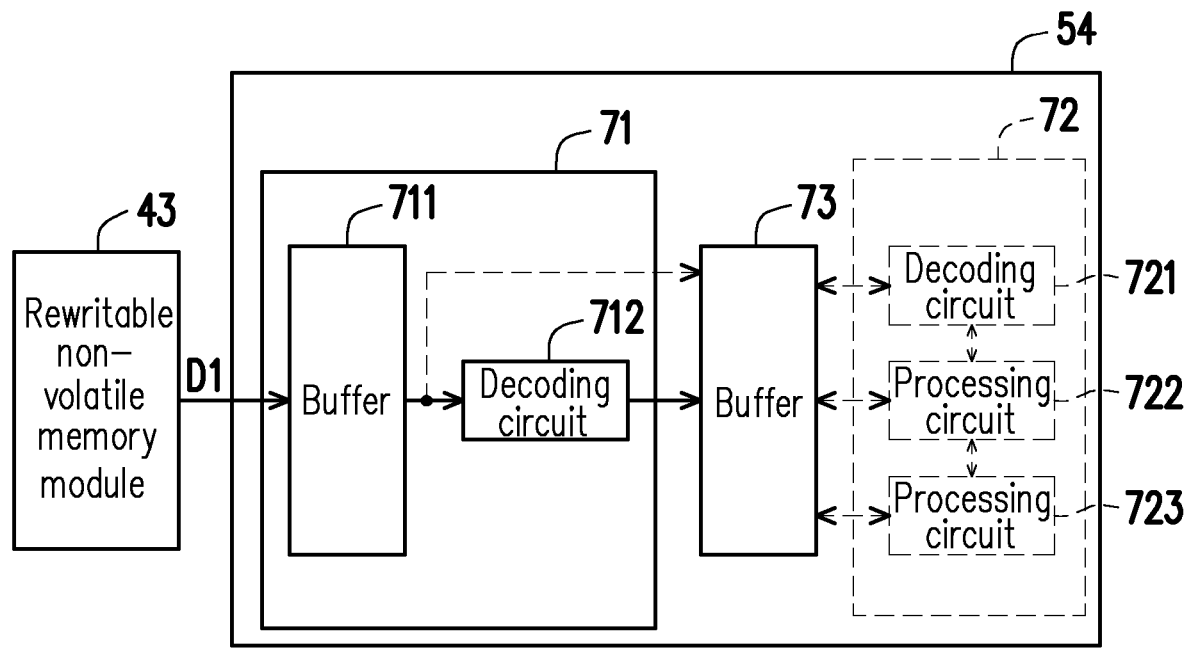
FIG. 8 is a schematic diagram of decoding first data via a first decoding circuit shown according to an exemplary embodiment of the invention.

FIG. 8 is a schematic diagram of decoding first data via a first decoding circuit shown according to an exemplary embodiment of the invention. Please refer to FIG. 8, the decoding circuit 712 may be configured to decode specific data (also referred to as the first data) D1 in the buffer 711. For example, the data D1 may be read from the rewritable non-volatile memory module 43 and stored in the buffer 711. The decoding circuit 712 may send the decoded data D1 to the buffer 73.

Figure 9:
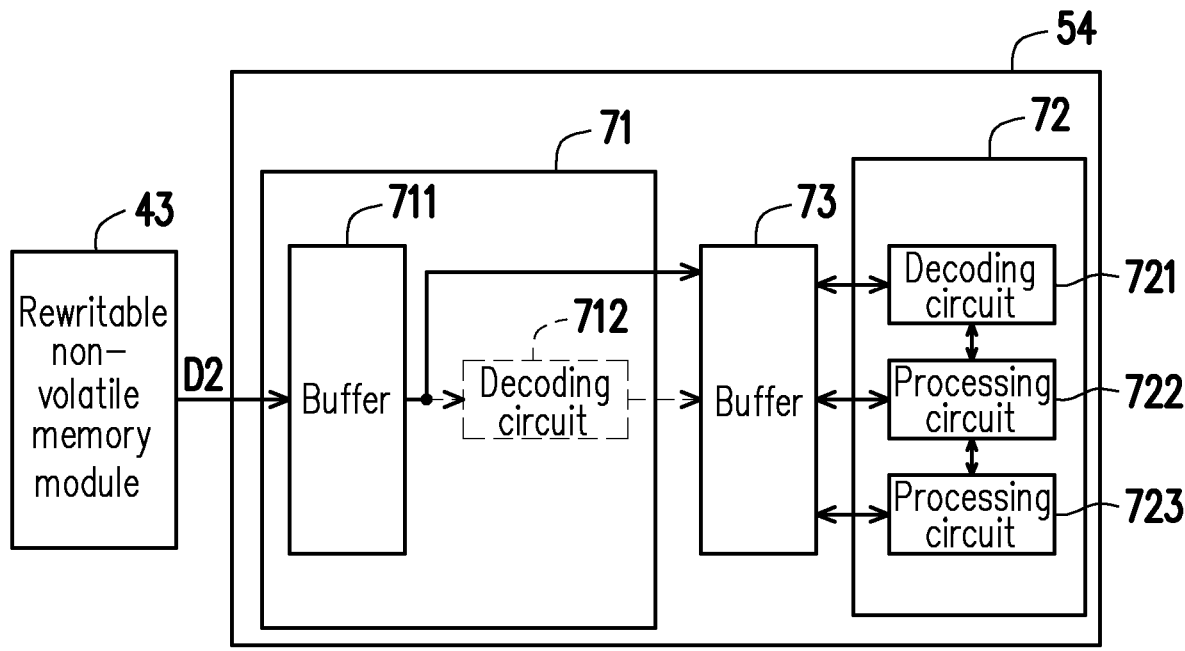
FIG. 9 is a schematic diagram of decoding second data via a second decoding circuit shown according to an exemplary embodiment of the invention.

FIG. 9 is a schematic diagram of decoding second data via a second decoding circuit shown according to an exemplary embodiment of the invention. Please refer to FIG. 9, the decoding circuit 721 may be configured to decode specific data (also referred to as the second data) D2 in the buffer 73. For example, the data D2 may be read from the rewritable non-volatile memory module 43, cached in the buffer 711, and then stored in the buffer 73. The decoding circuit 721 may return the decoded data D2 to the buffer 73.

In an exemplary embodiment, in response to the decoding circuit 712 failing to decode the data D1 read from a certain physical unit (also referred to as the first physical unit), the data D2 may be read from the same physical unit (i.e., the first physical unit) and decoded by the decoding circuit 721 with stronger decoding ability. In particular, when the decoding circuit 721 decodes the data D2, the decoding circuit 712 may continue to decode the next data without waiting for the decoding circuit 721 to release the busy state.

From another perspective, in the exemplary embodiments of FIG. 8 and FIG. 9, the decoding operations performed by the decoding circuits 712 and 721 may not interfere with each other, and/or the decoding operations performed by the decoding circuits 712 and 721 may not need to wait for each other. For example, when the decoding circuit 712 decodes the data D1 in the buffer 711 (as shown in FIG. 8), the decoding circuit 721 may synchronously decode the data D2 in the buffer 73 (as shown in FIG. 9). In this way, even if the decoding circuit 721 continues to be busy, the decoding circuit 712 may still perform the decoding of other data synchronously. Compared with the traditional decoding circuit 712 that needs to wait for the decoding circuit 721 to complete the decoding operation before processing new data, the working efficiency of the decoding circuit 712 may be improved.

In an exemplary embodiment, the decoding circuit module 54 may include a circuit module (also referred to as a first circuit module) 71 and a circuit module (also referred to as a second circuit module) 72. The decoding circuit 712 and the buffer 711 may be disposed in the circuit module 71. The decoding circuit 721 may be disposed in the circuit module 72. For example, the circuit module 71 may be disposed in a certain circuit board (also referred to as a first circuit board), and the circuit module 72 may be disposed in another circuit board (also referred to as a second circuit board). Alternatively, the circuit modules 71 and 72 may also be disposed in different areas on the same circuit board. The buffer 73 may be coupled to the circuit modules 71 and 72.

In an exemplary embodiment, the data in the buffer 711 is only used by a circuit in the circuit module 71 (for example, the decoding circuit 712). In an exemplary embodiment, the data in the buffer 73 may be used by a circuit in the circuit modules 71 and 72 (for example, the decoding circuits 712 and 721).

In an exemplary embodiment, both the data D1 and D2 may include hard bit data. The hard bit data refers to data read from a single memory cell in the rewritable non-volatile memory module 43 using a single read voltage level. In hard bit decoding mode, the decoding circuit 712 may decode the hard bit data in the buffer 711 and/or the decoding circuit 721 may decode the hard bit data in the buffer 73. In addition, in hard bit decoding mode, the read voltage level configured to read a specific memory cell (or physical cell) may be adjusted to attempt to reduce the probability of reading the wrong bit.

Compared with hard bit data, soft bit data refers to data obtained by repeatedly reading a single memory cell in the rewritable non-volatile memory module 43 using a plurality of read voltage levels. Compared with the hard bit data, the soft bit data may contain more information that may assist in decoding the data stored in the memory cell. In soft bit decoding mode, the reliability data corresponding to the data D2 may be generated based on the soft bit data, and the decoding circuit 721 may decode the data D2 according to the reliability data to improve the decoding success rate of the data D2.

In an exemplary embodiment, the decoding circuit module 54 further includes a processing circuit (also referred to as a first processing circuit) 722. The processing circuit 722 may be coupled to the buffer 73 and the decoding circuit 721. For example, the processing circuit 722 may be disposed in the circuit module 72. In the exemplary embodiment of FIG. 9, the processing circuit 722 may be configured to generate reliability data corresponding to the data D2. For example, the reliability information may be temporarily stored in the buffer 73 or directly provided to the decoding circuit 721 for use without the buffer 73. The decoding circuit 721 may decode the data D2 according to the reliability data. For example, the reliability data may include Log-Likelihood Ratio (LLR), etc. that may be used as auxiliary data in the decoding process to assist in determining whether a specific bit in the data D2 should be decoded into bit "1" or "0".

In an exemplary embodiment, the decoding circuit module 54 further includes a processing circuit (also referred to as a second processing circuit) 723. The processing circuit 723 may be coupled to the buffer 73 and the processing circuit 722. For example, the processing circuit 723 may be disposed in the circuit module 72. In the exemplary embodiment of FIG. 9, the processing circuit 723 may generate soft bit data according to the data (also referred to as third data) read from the rewritable non-volatile memory module 43. For example, the soft bit data may be temporarily stored in the buffer 73 or directly provided to the processing circuit 722 for use without the buffer 73. The processing circuit 722 may generate reliability data corresponding to the data D2 according to the soft bit data. For example, the processing circuit 722 may query the logarithmic similarity ratio mapping table according to the soft bit data to obtain the reliability data (such as the LLR value) corresponding to the data D2. Then, the processing circuit 722 may provide the reliability data to the decoding circuit 721 to decode the data D2.

It should be noted that in the exemplary embodiments of FIG. 7 to FIG. 9, more circuits having specific functions may be added to the circuit modules 71 and/or 72, and the invention is not limited in this regard. In addition, the coupling relationship of at least a portion of the circuits in the exemplary embodiments of FIG. 7 to FIG. 9 may also be adjusted, and the invention is not limited in this regard.

Based on the above, the exemplary embodiments of the invention enable all of the different types of decoding circuits (for example, having different decoding abilities) in the decoding circuit module to operate independently and without waiting for each other via a special circuit layout. In this way, the overall working efficiency of the decoding circuit module may be improved.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A decoding circuit module, configured to decode data read from a rewritable non-volatile memory module, the decoding circuit module comprising:
   a first buffer coupled to the rewritable non-volatile memory module;
   a second buffer coupled to the first buffer;
   a first decoding circuit coupled to the first buffer and the second buffer; and
   a second decoding circuit coupled to the second buffer,
   wherein the first decoding circuit is configured to decode first data read from the rewritable non-volatile memory module and stored in the first buffer,
   the second decoding circuit is configured to decode second data read from the rewritable non-volatile memory module and stored in the second buffer,
   a data decoding ability of the first decoding circuit is different from a data decoding ability of the second decoding circuit, and the second data is stored in the second buffer via the first buffer and is not decoded by the first decode circuit.

2. The decoding circuit module of claim 1, wherein the first decoding circuit is further configured to transmit the decoded first data to the second buffer.

3. The decoding circuit module of claim 1, wherein the second decoding circuit is further configured to transmit the decoded second data to the second buffer.

4. The decoding circuit module of claim 1, further comprising:
a first processing circuit coupled to the second decoding circuit,
wherein the first processing circuit is configured to generate reliability data corresponding to the second data, and
the second decoding circuit is further configured to decode the second data according to the reliability data.

5. The decoding circuit module of claim 4, further comprising:
a second processing circuit coupled to the first processing circuit,
wherein the second processing circuit is configured to generate soft bit data according to third data read from the rewritable non-volatile memory module, and
the first processing circuit is further configured to generate the reliability data according to the soft bit data.

6. The decoding circuit module of claim 1, wherein the first decoding circuit is configured to implement a bit flipping algorithm.

7. The decoding circuit module of claim 1, wherein the second decoding circuit is configured to implement at least one of a sum-product algorithm and a min-sum algorithm.

8. The decoding circuit module of claim 1, wherein the first buffer is dedicated to temporarily storing data read from the rewritable non-volatile memory module.

9. The decoding circuit module of claim 1, wherein the decoding circuit module further comprises a first circuit module and a second circuit module, the first decoding circuit and the first buffer are disposed in the first circuit module, the second decoding circuit is disposed in the second circuit module, and the second buffer is coupled to the first circuit module and the second circuit module.

10. The decoding circuit module of claim 9, wherein data in the first buffer is only used by a circuit in the first circuit module, and data in the second buffer may be used by a circuit in the first circuit module or the second circuit module.

11. A memory control circuit unit, configured to control a rewritable non-volatile memory module, the memory control circuit unit comprising:
a host interface configured to be coupled to a host system;
a memory interface configured to be coupled to the rewritable non-volatile memory module;
a decoding circuit module coupled to the rewritable non-volatile memory module and configured to decode data read from the rewritable non-volatile memory module; and
a memory management circuit coupled to the host interface, the memory interface, and the decoding circuit module,
wherein the decoding circuit module comprises:
a first buffer coupled to the rewritable non-volatile memory module;
a second buffer coupled to the first buffer;
a first decoding circuit coupled to the first buffer and the second buffer; and
a second decoding circuit coupled to the second buffer,
wherein the first decoding circuit is configured to decode first data read from the rewritable non-volatile memory module and stored in the first buffer,
the second decoding circuit is configured to decode second data read from the rewritable non-volatile memory module and stored in the second buffer,
a data decoding ability of the first decoding circuit is different from a data decoding ability of the second decoding circuit, and
the second data is stored in the second buffer via the first buffer and is not decoded by the first decode circuit.

12. The memory control circuit unit of claim 11, wherein the first decoding circuit is further configured to transmit the decoded first data to the second buffer.

13. The memory control circuit unit of claim 11, wherein the second decoding circuit is further configured to transmit the decoded second data to the second buffer.

14. The memory control circuit unit of claim 11, wherein the decoding circuit module further comprises:
a first processing circuit coupled to the second decoding circuit,
wherein the first processing circuit is configured to generate reliability data corresponding to the second data, and
the second decoding circuit is further configured to decode the second data according to the reliability data.

15. The memory control circuit unit of claim 14, wherein the decoding circuit module further comprises:
a second processing circuit coupled to the first processing circuit,
wherein the second processing circuit is configured to generate soft bit data according to third data read from the rewritable non-volatile memory module, and
the first processing circuit is further configured to generate the reliability data according to the soft bit data.

16. The memory control circuit unit of claim 11, wherein the first decoding circuit is configured to implement a bit flipping algorithm.

17. The memory control circuit unit of claim 11, wherein the second decoding circuit is configured to implement at least one of a sum-product algorithm and a min-sum algorithm.

18. The memory control circuit unit of claim 11, wherein the first buffer is dedicated to temporarily storing data read from the rewritable non-volatile memory module.

19. The memory control circuit unit of claim 11, wherein the decoding circuit module further comprises a first circuit module and a second circuit module, the first decoding circuit and the first buffer are disposed in the first circuit module, the second decoding circuit is disposed in the second circuit module, and the second buffer is coupled to the first circuit module and the second circuit module.

20. The memory control circuit unit of claim 19, wherein data in the first buffer is only used by a circuit in the first circuit module, and data in the second buffer may be used by a circuit in the first circuit module or the second circuit module.

21. A memory storage device, comprising:
a connection interface unit configured to be coupled to a host system;
a rewritable non-volatile memory module; and
a memory control circuit unit coupled to the connection interface unit and the rewritable non-volatile memory module,
wherein the memory control circuit unit comprises a decoding circuit module, the decoding circuit module comprises:
- a first buffer coupled to the rewritable non-volatile memory module;
- a second buffer coupled to the first buffer;
- a first decoding circuit coupled to the first buffer and the second buffer; and
- a second decoding circuit coupled to the second buffer,
- wherein the first decoding circuit is configured to decode first data read from the rewritable non-volatile memory module and stored in the first buffer,
- the second decoding circuit is configured to decode second data read from the rewritable non-volatile memory module and stored in the second buffer,
- a data decoding ability of the first decoding circuit is different from a data decoding ability of the second decoding circuit, and
- the second data is stored in the second buffer via the first buffer and is not decoded by the first decode circuit.

22. The memory storage device of claim 21, wherein the first decoding circuit is further configured to transmit the decoded first data to the second buffer.

23. The memory storage device of claim 21, wherein the second decoding circuit is further configured to transmit the decoded second data to the second buffer.

24. The memory storage device of claim 21, wherein the decoding circuit module further comprises:
- a first processing circuit coupled to the second decoding circuit,
- wherein the first processing circuit is configured to generate reliability data corresponding to the second data, and
- the second decoding circuit is further configured to decode the second data according to the reliability data.

25. The memory storage device of claim 24, wherein the decoding circuit module further comprises:
- a second processing circuit coupled to the first processing circuit,
- wherein the second processing circuit is configured to generate soft bit data according to third data read from the rewritable non-volatile memory module, and
- the first processing circuit is further configured to generate the reliability data according to the soft bit data.

26. The memory storage device of claim 21, wherein the first decoding circuit is configured to implement a bit flipping algorithm.

27. The memory storage device of claim 21, wherein the second decoding circuit is configured to implement at least one of a sum-product algorithm and a min-sum algorithm.

28. The memory storage device of claim 21, wherein the first buffer is dedicated to temporarily storing data read from the rewritable non-volatile memory module.

29. The memory storage device of claim 21, wherein the decoding circuit module further comprises a first circuit module and a second circuit module, the first decoding circuit and the first buffer are disposed in the first circuit module, the second decoding circuit is disposed in the second circuit module, and the second buffer is coupled to the first circuit module and the second circuit module.

30. The memory storage device of claim 29, wherein data in the first buffer is only used by a circuit in the first circuit module, and data in the second buffer may be used by a circuit in the first circuit module or the second circuit module.

* * * * *